United States Patent [19]

Wong et al.

[11] Patent Number: 4,921,347

[45] Date of Patent: May 1, 1990

[54] METHOD AND APPARATUS FOR CALIBRATING A LIGHTWAVE COMPONENT MEASUREMENT SYSTEM

[75] Inventors: Roger W. Wong; Hugo Vifian; Michael G. Hart, all of Santa Rosa, Calif.

[73] Assignee: Hewlett-Packard Company, Palo Alto, Calif.

[21] Appl. No.: 148,391

[22] Filed: Jan. 25, 1988

[51] Int. Cl.$^5$ .............................................. G01N 21/00
[52] U.S. Cl. .................................... 356/73.1; 356/243
[58] Field of Search .............................. 356/73.1, 243

[56] References Cited

U.S. PATENT DOCUMENTS 4,703,433 10/1987 Sharrit .................................. 364/485

OTHER PUBLICATIONS

"Frequency Domain Optical Reflectometer", MacDonald, Applied Optics, 5-1981, pp. 1840-1844.

Primary Examiner—Vincent P. McGraw
Assistant Examiner—S. A. Turner
Attorney, Agent, or Firm—William C. Milks, III

[57] ABSTRACT

A method and apparatus for calibrating absolute and relative measurements of modulation and/or demodulation transfer characteristics of electro-optical and opto-electrical devices during setup of a lightwave component measurement system for characterizing performance of fiber optic systems and associated components. The lightwave component measurement system calibrated in accordance with the method of the invention provides the capability to measure the optical, electrical, and, especially, the electro-optical (E/O) and opto-electrical (O/E) components with specified measurement performance. In accordance with the calibration method of the invention, when the lightwave component measurement system is used to characterize an E/O or O/E device, an initial calibration reference is established based on the known characteristics of a lightwave source and lightwave receiver included in the lightwave component measurement system. A measurement is then performed on the calibration reference (the lightwave source or the lightwave receiver), and error correction data are produced and stored in a lightwave component analyzer included in the lightwave component measurement system. The modulation (or demodulation) transfer characteristics are preferably given in terms of the responsivity magnitude and phase versus modulation frequency. A device under test (DUT) then is measured when it replaces its calibrated counterpart in the measurement setup. The lightwave component analyzer uses the error correction data when the E/O or O/E characteristics of the DUT are measured.

20 Claims, 12 Drawing Sheets

METHOD AND APPARATUS FOR CALIBRATING A LIGHTWAVE COMPONENT MEASUREMENT SYSTEM

BACKGROUND OF THE INVENTION

This invention relates to electronic test instruments and, more particularly, to electronic instrumentation for signal measurements during tests performed on electro-optical and/or opto-electrical systems and associated components. Specifically, the invention is directed to calibrating electronic test instruments for accurately performing such tests.

An exemplary use of the invention is in the field of optical and electrical signal measurements in connection with fiber optic systems. With higher bit rates and wider-band modulations becoming prevalent in fiber optic systems, the designers and manufacturers of these systems and associated components need to be able to characterize performance more thoroughly and more precisely than has been the case with lower transmission bandwidths. Many new fiber optic systems now operate at speeds of 500 MBPS and higher, which are equivalent to RF and low microwave frequencies. In addition, even though optical fiber cable is correctly classified as a low-loss medium, a fiber optic system can, in fact, have significant losses that must be identified if they are to be minimized. Accordingly, the test measurements performed to characterize such a system have proliferated.

Various test systems have been developed to meet these measurement needs. Techniques for calibrating these test systems for performing the desired signal measurements have also been developed to a limited extent. However, no known fiber optic test system manufacturer currently offers sources or receivers (or electro-optical and opto-electrical converters) calibrated in terms of their modulation (or demodulation) transfer characteristics. This has resulted in errors during testing.

SUMMARY OF THE INVENTION

One embodiment of the present invention provides a method and apparatus for calibrating absolute and relative measurements of modulation and/or demodulation transfer characteristics of electro-optical and opto-electrical devices during setup of a lightwave component measurement system for characterizing performance of fiber optic systems and associated components. Accordingly, the lightwave component measurement system can measure modulation (demodulation) bandwidth, modulation (demodulation) transfer functions, loss, delay, dispersion, length, and reflections of fiber optic system components, such as modulators, demodulators, optical fiber cable, and fiber components, based on frequency domain measurements, with improved accuracy. The lightwave component measurement system calibrated in accordance with the method of the invention provides the capability to measure the optical, electrical, and, especially, the electro-optical (E/0) and opto-electrical (0/E) components with specified measurement performance.

In accordance with the calibration method of the invention, when the lightwave component measurement system is used to characterize an E/0 or 0/E device, an initial calibration reference is established based on the known characteristics of a lightwave source and lightwave receiver included in the lightwave component measurement system. A measurement is then performed on the calibration reference (the lightwave source or the lightwave receiver), and error correction data are produced and stored in a lightwave component analyzer included in the lightwave component measurement system. The modulation (or demodulation) transfer characteristics are preferably given in terms of the responsivity magnitude and phase versus modulation frequency. A device under test (DUT) then is measured when it replaces its calibrated counterpart in the measurement setup. The lightwave component analyzer uses the error correction data when the E/0 or 0/E characteristics of the DUT are measured.

Calibration of the lightwave component measurement system in accordance with the invention facilitates measuring the modulation response of fiber optic systems and associated components with improved precision. These include not only the optical and electrical components, but also E/0 and 0/E converters; i.e., the transmitters and receivers. The lightwave component measurement system performs its measurements faster and more accurately than known commercially available test systems.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings. In the drawings.

DETAILED DESCRIPTION OF THE PREFERRED EMBODIMENTS

Figure 1:
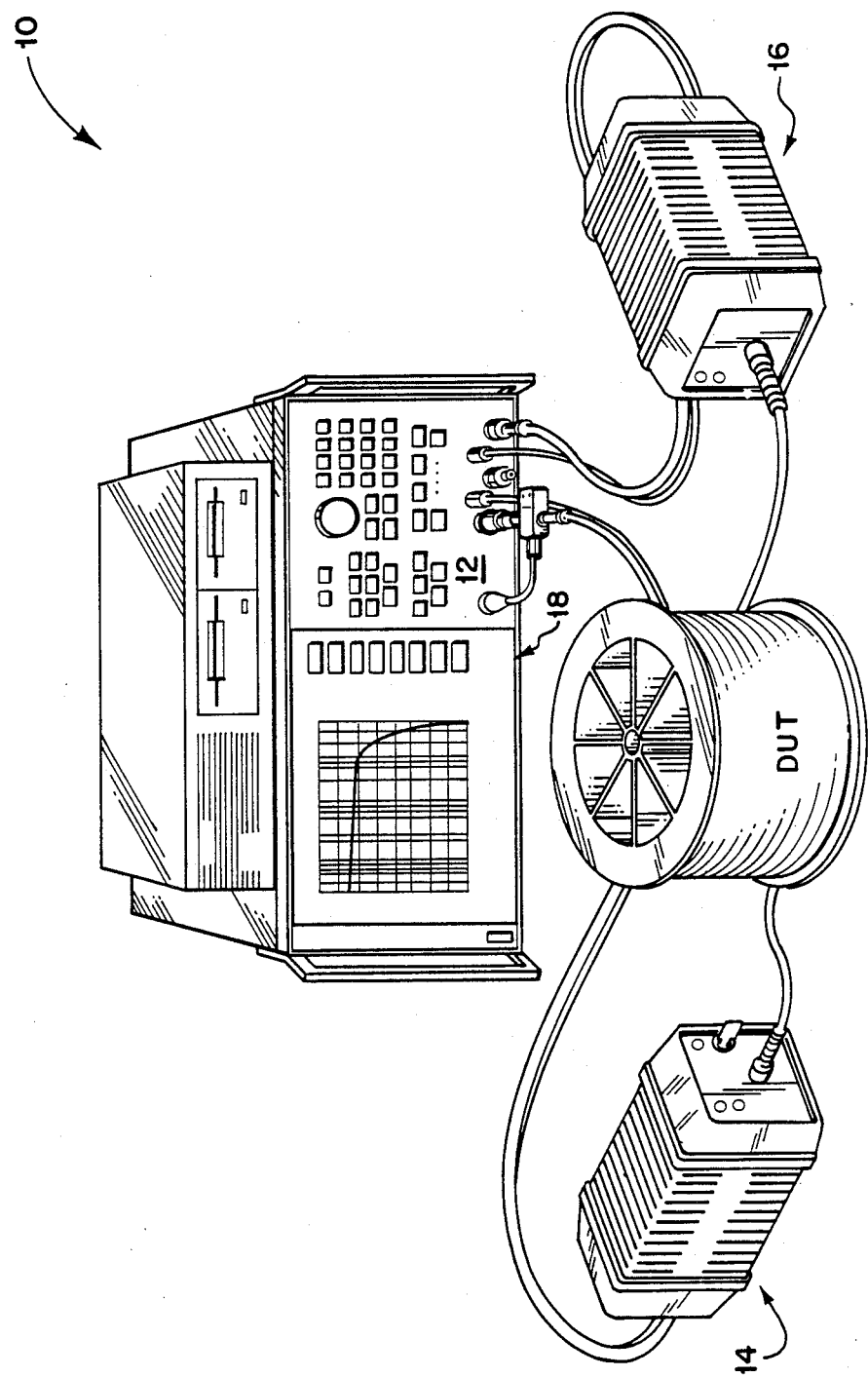
FIG. 1 is a block diagram of a lightwave component measurement system incorporating calibration in accordance with one embodiment of the invention.

FIG. 1 shows a lightwave component measurement system, generally indicated by the numeral 10. Its principal elements are a lightwave component analyzer 12, a lightwave source 14, and a lightwave receiver 16. All of the elements of the lightwave component measurement system 10, including the lightwave source 14 and the lightwave receiver 16, are extensively characterized so that high levels of precision in lightwave measurements are achieved when the lightwave component measurement system is calibrated in accordance with the method of the invention. FIG. 1 also shows a device under test (DUT), for example, a spool of optical fiber cable, connected to the lightwave component measurement system 10.

The lightwave component analyzer 12 preferably comprises essentially a 3 GHz vector network analyzer, for example, an HP 8753 vector network analyzer available from Hewlett-Packard Company, Network Measurements Division, Santa Rosa, California, specifically tailored for lightwave measurements. It provides 300 kHz to 3 GHz test signals used to modulate either a single-mode or multi-mode lightwave source 14 preferably operating at 1300 nm.

The electro-optical characteristics of the lightwave source 14 and the opto-electrical characteristics of the lightwave receiver 16 in a test setup have to be sensitive, stable, and repeatable. Also, their modulation bandwidths need to be wider than that of the DUT. The lightwave source 14 and the lightwave receiver 16 preferably have the following performance characteristics.

The lightwave source 14 provides a modulation signal source which preferably generates a highstability, 1 Hz-resolution synthesized signal that can be swept from 300 kHz to 3 GHz. The lightwave source 14 can be a single-mode or multi-mode lightwave source which incorporates stable laser diodes as 1300 nm light sources with narrow, clean spectra. Modulation bandwidth of the lightwave source 14 is 3 GHz, with better than +/−3.0 dB flatness. This can be significantly improved when the calibration method in accordance with the invention is used. The optical dynamic range of the lightwave source 14 is typically 40 dB or more. The intensity-modulated light signal from the lightwave source 14 is applied to the DUT.

The lightwave receiver 16 is a high-stability, high-resolution precision receiver with 100 dB dynamic range which allows measurements over a wide dynamic range and enables the lightwave component measurement system 10 to operate with an optical sensitivity of −4.0 dBm. The lightwave receiver 16 operates with both single-mode and multi-mode optical fiber cables. Its optical detector is preferably a PIN photodiode. The lightwave receiver 16 has a modulation bandwidth that preferably extends to 3 GHz, with +/−4 dB flatness to 2 GHz, rolling off to −14 dB at 3 GHz. As with the lightwave source 14, the flatness of the lightwave receiver 16 is also improved significantly when the calibration method in accordance with the invention is used. Minimum detectable optical signal (for modulations up to 2 GHz) is −40 dBm, and the typical optical dynamic range exceeds 40 dB. The 3 GHz modulation bandwidths of the lightwave source 14 and the lightwave receiver 16 provide ample margin for typical tests.

The lightwave receiver 16 demodulates the modulated light signal for processing in the lightwave component analyzer 12. The transmission and reflection characteristics of the DUT are then displayed, preferably on a cathode ray tube (CRT) 18 included in the lightwave component analyzer 12. The transmission and reflection data can be displayed either as a function of the RF modulation frequency or as a function of RF power, time, or distance.

The lightwave component measurement system 10 measures modulation (demodulation) bandwidth, modulation (demodulation) transfer functions, loss, delay, dispersion, and reflections of fiber optic system components, such as modulators, demodulators, optical fiber cables, and fiber components, based on frequency domain measurements. For optical components (such as optical fiber cable, couplers, and connectors), the lightwave component measurement system 10 can measure such parameters as modulation bandwidth, optical insertion loss, pulse dispersion, optical reflections, and length. In addition, single and multiple reflections can be resolved in time and distance with very high resolution. This enables precise location of one or more discontinuities and measurement of optical fiber cable length.

Insofar as optical measurements are concerned, typical optical components are optical fiber cable, modulators, and passive devices, such as switches, splitters, combiners, and attenuators. The input and output signals for testing these devices are light, and the key parameters measured are attenuation versus modulation frequency, modulation bandwidth, delay, modal pulse dispersion, location of discontinuities, and length.

The RF (or electrical) elements of the fiber optic system under test can also be characterized using the lightwave component measurement system 10. Examples of RF devices are amplifiers, filters, and cables used in a fiber optic system. The RF measurements include bandwidth, insertion loss/gain, phase, group delay, and complex impedance.

Electrical measurements can be performed on such RF components as amplifiers, filters, and cables, or a complete fiber optic repeater (comprising an optical transmitter, optical fiber cable, and optical receiver). Typical measurements include loss/gain versus modulation frequency or power level, modulation bandwidth, modulation phase shift or phase delay, distortion (e.g., group delay or deviation from linear phase), complex impedance (magnitude and phase), and electrical length (including discontinuity location).

Additionally, in accordance with the invention, the modulation transfer characteristics of electro-optical (E/0) transmitters and opto-electrical (0/E) receivers can also be precisely measured. For example, the responsivity of a PIN diode or laser diode can be measured, not only at one modulation frequency, but also as a function of modulation frequency from 300 kHz to 3 GHz. Additionally, the RF output power of the lightwave component analyzer 12 can be swept up to 25 dBm to characterize the sensitivity or compression point of a source or receiver or determine it's optimum operating condition.

Representative E/0 devices are optical modulators and sources (such as laser diodes and LEDs). Examples of 0/E devices are PIN or avalanche photodiode detectors in optical receivers. The key parameters for these devices are the same for both types, except that the independent and dependent variables are reversed; i.e., for E/0 devices, optical power out is measured as a function of electrical (RF) drive, whereas RF power out as a function of optical drive is measured for 0/E devices. Typical measurements for these devices are sensitivity (including the compression point and the noise threshold/floor), as well as responsivity versus power or modulating frequency, as shown in FIGS. 2-11.

Typical test measurement uncertainties for the basic categories of measurements that can be performed with the lightwave component measurement system 10 are shown in Table I below.

TABLE I

| Measurement Uncertainty | |
|---|---|
| Optical measurements | |
| Test component characteristics: | |
| Insertion loss | 10 dB |
| Optical match | 20 dB |
| Transmission measurement uncertainty: | |
| Magnitude | +/−1.4 dB |
| Deviation from linear phase: | |
| 50 MHz | +/−7 degrees |
| 3 GHz | +/−12.4 degrees |
| Dynamic range | 45 dB |
| Reflection measurement uncertainty: | |
| Magnitude | +2.5 dB |
|  | −3.7 dB |
| Dynamic range | 40 dB |
| Electro-optical | |
| Test component characteristics: | |
| Responsivity | 0.1 |
| Optical match | 10 dB |
| Electrical Match | 14 dB |
| Modulation transfer characteristics uncertainty: | |
| Absolute magnitude | +/−5.13 dB |
| Relative magnitude | +/−3.39 dB |
| Deviation from linear phase: | |
| 50 MHz | +/−13 degrees |
| 3 GHz | +/−26.8 degrees |
| Opto-electrical | |
| Test component characteristics: | |
| Responsivity | 0.3 |
| Optical match | 14 dB |
| Electrical match | 14 dB |
| Demodulation transfer characteristic uncertainty: | |
| Absolute magnitude | +/−5.16 dB |
| Relative magnitude | +/−3.30 dB |
| Deviation from linear phase: | |
| 50 MHz | +/−13 degrees |
| 3 GHz | +/−25.8 degrees |
| Electrical | |
| Test component characteristics: | |
| Insertion loss | 10 dB |
| Electrical match | 14 dB |
| Transmission measurement uncertainty: | |
| Magnitude | +/−.13 dB |
| Phase | +/−2.3 degrees |
| Dynamic range | 100 dB |
| Reflection measurement uncertainty: | |
| Magnitude | +/−.42 dB |
| Phase | +/−4.2 degrees |

Calibration in accordance with the invention involves the lightwave component analyzer 12, lightwave source 14, and lightwave receiver 16. In accordance with the calibration method of the invention, when the lightwave component measurement system 10 is used to characterize an E/O or O/E device, an initial calibration reference is established based on the known characteristics of the lightwave source 14 and the lightwave receiver 16. A measurement is then performed on the calibration reference (the lightwave source 14 or the lightwave receiver 16), and error correction data are produced and stored in the lightwave component analyzer 12. The modulation (or demodulation) transfer characteristics are preferably given in terms of the responsivity magnitude and phase versus modulation frequency. The DUT then is measured when it replaces its calibrated counterpart in the measurement setup. The lightwave component analyzer 12 uses the error correction data when the E/O or O/E characteristics of the DUT are measured.

Both the lightwave source 14 and the lightwave receiver 16 are earlier characterized in terms of their modulation (and demodulation) transfer characteristics (both absolute magnitude and phase). The calibration data for accurate characterization of the lightwave source 14 and the lightwave receiver 16 are preferably measured at the time of construction or later maintenance and stored on a 3.5-inch micro flexible disc. Alternatively, calibration data can be keyed into the lightwave component analyzer 12 by the user. The lightwave component analyzer 12 incorporates firmware which can read in and store the calibration data for the lightwave source 14 and/or the lightwave receiver 16 for use in subsequent calibrations of the lightwave component measurement system 10 prior to fiber optic system and associated component test measurements.

The lightwave component measurement system 10 allows the measurement of the analog portion of the lightwave source 14 (transmitter) separately from the lightwave receiver 16, or visa versa. The measurements are fast and accurate, and the measurement process is convenient and easy to use. This provides the modulation/demodulation transfer measurement capability for assuring precise test measurements.

Figure 2:
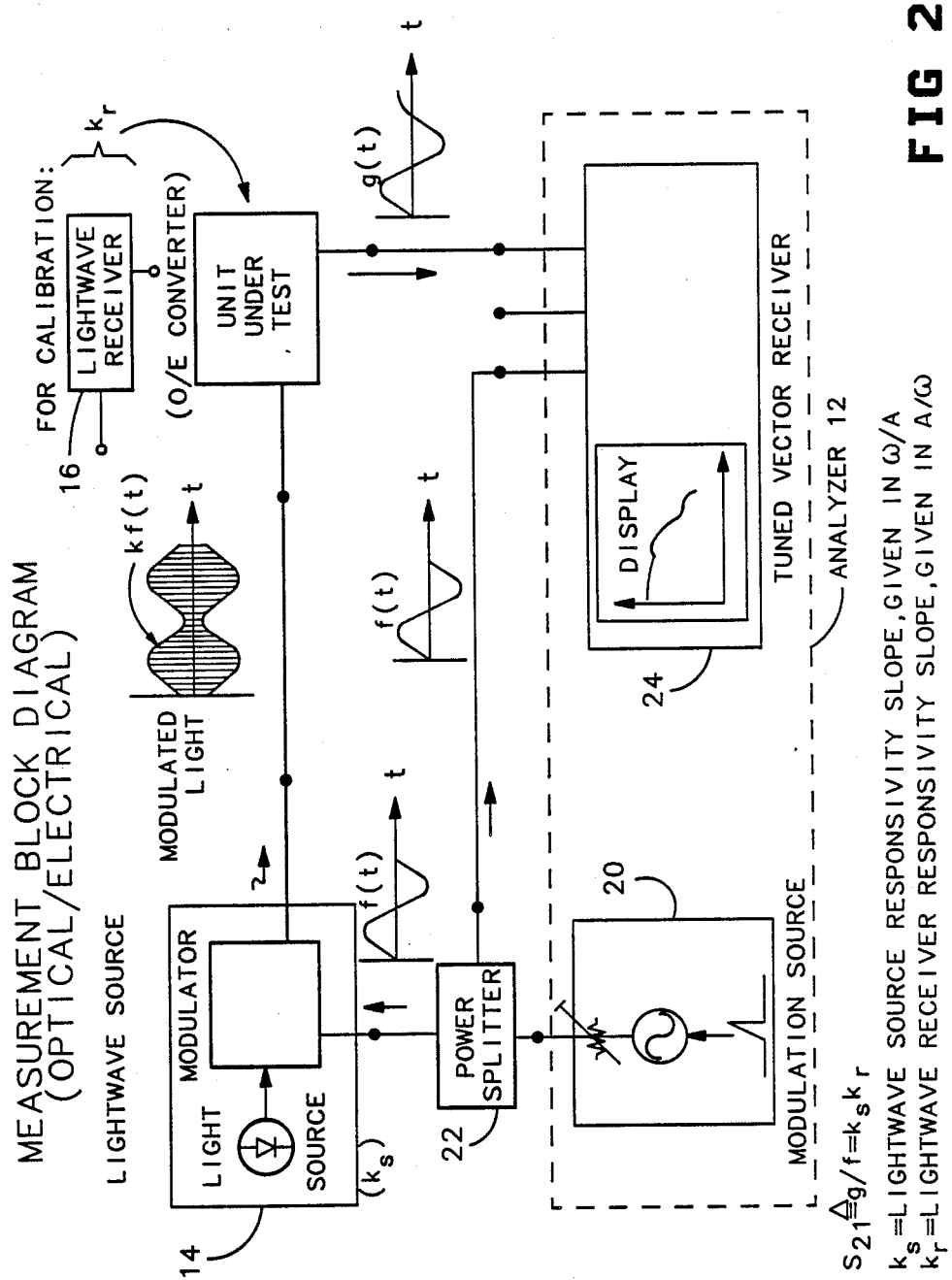
FIG. 2 is a block diagram of the lightwave component measurement system shown in FIG. 1 configured for calibrating opto-electrical test measurements.
Figure 3:
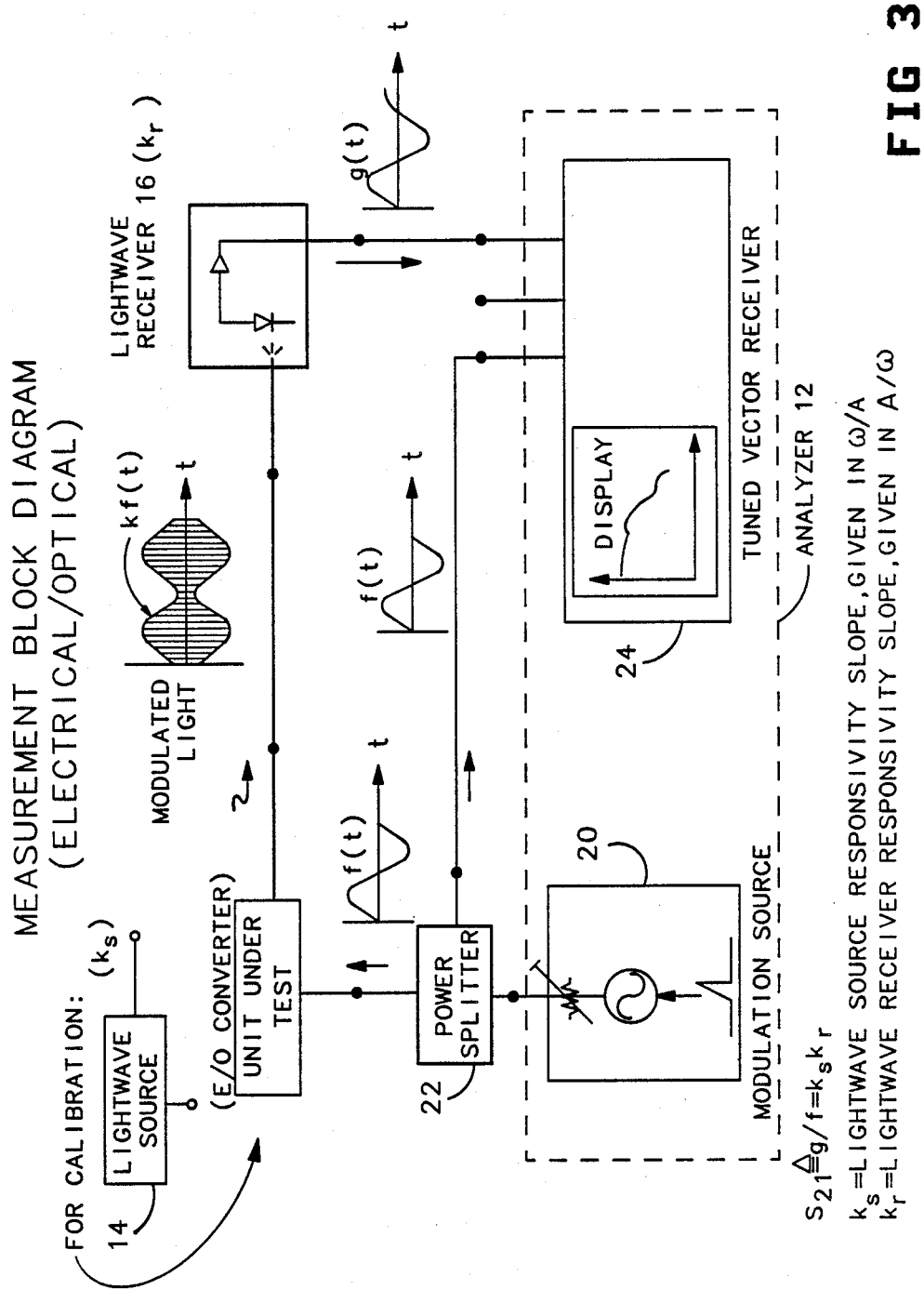
FIG. 3 is a block diagram of the lightwave component measurement system shown in FIG. 1 configured for calibrating electro-optical test measurements.

Considered in more detail, calibration in accordance with the invention involves connection of the lightwave component analyzer 12, lightwave source 14, and lightwave receiver 16, as shown in the system block diagrams of FIGS. 2 and 3, for measuring modulation and demodulation transfer characteristics of electro-optical and opto-electrical DUTs, respectively. The transfer characteristic parameters are given in terms of modulation bandwidth magnitude and phase response, sensitivity (or slope responsivity), and slope responsivity 1 dB compression response (similar to amplifier power compression characteristics).

FIG. 2 shows a block diagram of the lightwave component measurement system 10 configured for calibrating opto-electrical test measurements. Similarly, FIG. 3 shows a corresponding block diagram of the lightwave component measurement system 10 configured for calibrating electro-optical test measurements.

As shown in FIGS. 2 and 3, the lightwave component analyzer 12 includes a modulation source 20 which generates a 300 kHz to 3 GHz electrical signal. The electrical signal is preferably input to a power splitter 22 which initially feeds a selected portion of the electrical signal generated by the modulation source 20 to an electro-optical (E/O) transducer in the form of the lightwave source 14 during calibration. Another portion of the electrical signal generated by the modulation source 20 is fed as a reference signal to one input port of a tuned vector receiver 24 included in the lightwave component analyzer 12.

The lightwave source 14 converts the electrical signal generated by the modulation source 20 to an optical signal. The optical signal produced by the lightwave source 14 is initially input to an opto-electrical (O/E) transducer in the form of the lightwave receiver 16 during calibration. As shown in FIG. 2, after calibration, a DUT in the form of an opto-electrical fiber optic system or associated component can be later substituted for the lightwave receiver 16 so that the DUT can be tested.

The lightwave receiver 16 reconverts the received optical signal to an electrical signal. The electrical signal produced by the lightwave receiver 16 is fed to another input port of the tuned vector receiver 24 during calibration. As shown in FIG. 3, after calibration, a DUT in the form of an electro-optical fiber optic system or associated component can be later substituted for the lightwave source 14 so that the DUT can be tested.

Modulator (source) and demodulator (receiver) measurements can be explained in conjunction with FIGS. 2 and 3. The block diagrams shown in FIGS. 2 and 3 depict the calibration measurements to characterize the primary modulator (source)/demodulator (receiver) transfer function parameters, namely, modulation/demodulation bandwidth, sensitivity (or slope responsivity), modulation magnitude and phase response, and slope responsivity 1 dB compression point. FIGS. 3-7 show definitions of demodulator (receiver) transfer function parameters. FIGS. 2 and 8-11 show definitions of modulator (source) transfer function parameters.

In accordance with the invention, the lightwave component analyzer 12 included in the lightwave component measurement system 10 incorporates in firmware a set of encoded softkey menus, instructional text displays, and pictorial block diagram displays which guide and aid the user during the calibration process and while connecting the DUT for desired test measurements. Code for generating user selections, instructions, and diagrams is embedded as a portion of the instrument mainframe firmware.

Considered in more detail, the lightwave component analyzer 12 has programmed into its read only memory (ROM) firmware a combination of text and graphics which are displayed to make the lightwave component measurement system 10 easy to operate and use. The text and graphics show the user how to set up the lightwave component measurement system 10 so that a calibration can be performed easily and quickly.

Figure 12:
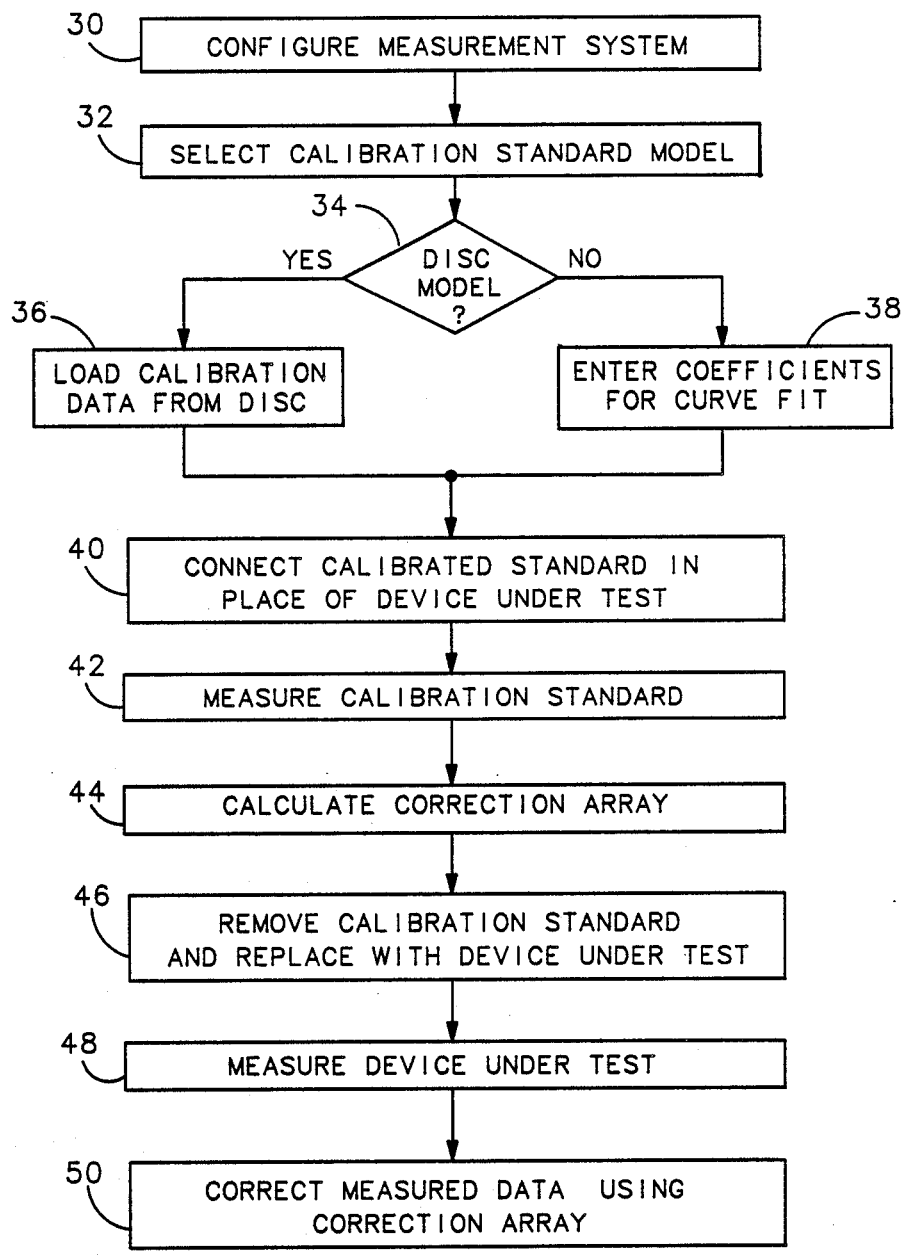
FIG. 12 is a flowchart of the calibration method in accordance with one embodiment of the invention.

FIG. 12 is a flowchart for calibrating the lightwave component measurement system 10 in accordance with the method of the invention. Initially, the lightwave component measurement system 10 is configured for opto-electrical or electro-optical test measurements, as shown in FIGS. 2 and 3, respectively, as indicated by the numeral 30 shown in FIG. 12. Next, the lightwave source 14 and the lightwave receiver 16 are calibrated in terms of their respective modulation (and demodulation) transfer functions. They are characterized in terms of their slope responsivity (for the lightwave source 14, watts per ampere; and for the lightwave receiver 16, amperes per watt; both in 50-ohm impedance systems), modulation magnitude response, and modulation phase response to 3 GHz. This applies to any upper modulation frequency.

The user selects a calibration standard model, as indicated by the numeral 32 shown in FIG. 12. Calibration data characterizing the frequency response of the lightwave source 14 or the lightwave receiver 16 can be stored in the lightwave component analyzer 12 in two different ways. On the one hand, at the step 32, the user can select source or receiver calibration data stored on a flexible disc, as indicated by the numeral 34. The lightwave component analyzer 12 can read the data from the disc for use in measurement error correction routines, as indicated by the numeral 36. On the other hand, at the step 32, the user can select performance of a curve fit on the calibration data to obtain coefficients for a rational polynomial equation for modelling the calibration data, as determined by the step 34. These coefficients, including a group delay term, are entered by the user into the lightwave component analyzer 12 using the analyzer front panel or by an external instrument controller through an HP-IB (Hewlett-Packard Company's implementation of the IEEE-488 instrument bus) rear panel connection, as indicated by the numeral 38. The coefficients are then used in measurement error correction routines.

The calibration measurement comprises two parts, first, the system calibration and, second, the measurement of the DUT. FIG. 2 shows the measurement block diagram for demodulators (or receivers) (FIG. 3 for modulators (or sources)).

The system calibration measurement initially requires the user to connect the calibrated standard, i.e., the lightwave source 14 or the lightwave receiver 16, in the lightwave component measurement system 10, as indicated by the numeral 40 shown in FIG. 12. In the case of opto-electrical test measurements on the DUT, the lightwave receiver 16 is the calibrated standard, as shown in FIG. 2. In the case of electro-optical test measurements on the DUT, the calibrated standard is the lightwave source 14, as shown in FIG. 3. Then, the characteristics of the calibrated standard (either the lightwave source 14 or the lightwave receiver 16) are measured, as indicated by the numeral 42 shown in FIG. 12. Finally, the lightwave component analyzer 12 computes error correction data, as indicated by the numeral 44.

The test measurements on the DUT initially require the user to remove the calibrated standard, i.e., the lightwave source 14 or the lightwave receiver 16, in the lightwave component measurement system 10, and replace it with the DUT, as indicated by the numeral 46. In the case of opto-electrical test measurements on the DUT, the DUT is substituted for the lightwave receiver 16, as shown in FIG. 2. In the case of electro-optical test measurements on the DUT, the DUT is substituted for the lightwave source 14, as shown in FIG. 3. Then, the characteristics of the DUT are measured, as indicated by the numeral 48 shown in FIG. 12. Finally, the lightwave component analyzer 12 compensates the test measurements on the DUT using the error correction data determined at the step 44, as indicated by the numeral 50.

One set of measurements is receiver or opto-electrical device sensitivity (responsivity slope) versus modulation frequency and modulation bandwidth measurements. During calibration of the lightwave component measurement system 10, the calibrated lightwave receiver 16 is substituted for the DUT, as shown in FIG. 2, and the receiver calibration information is read into the lightwave component analyzer 12. The RF power into the lightwave source 14 is held at a constant power level $[f(t)]$, and the modulation frequency is varied over some frequency range, $f_1$ to $f_2$.

The total system modulation frequency response is measured by the lightwave component analyzer 12. The complex ratio of $g/f$ is formed and is operated upon by the receiver calibration data.

The resultant calibration constants are then stored in the lightwave component analyzer 12 for later use. The calibration is now complete, and the next step is to measure an unknown device, i.e., the DUT.

Figure 4:
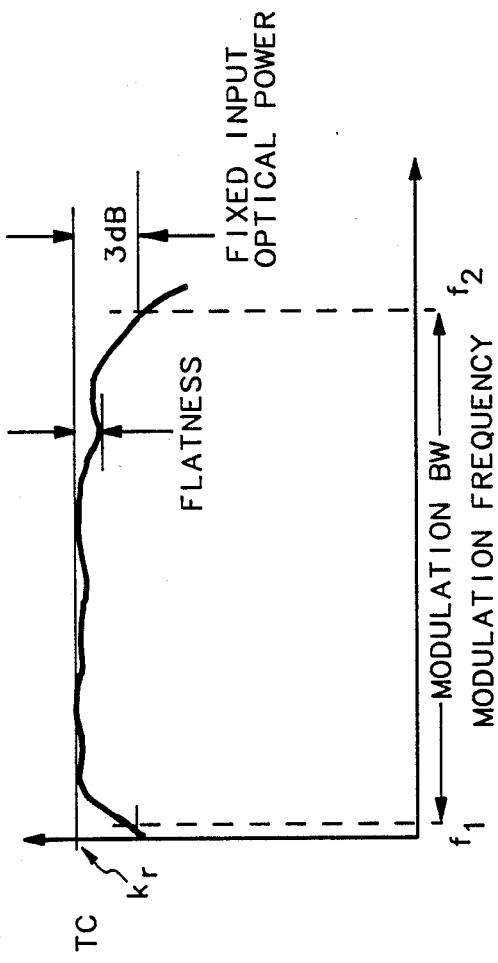
FIG. 4 illustrates measurement of responsivity versus modulating frequency for an opto-electrical device under test (DUT)
Figure 5:
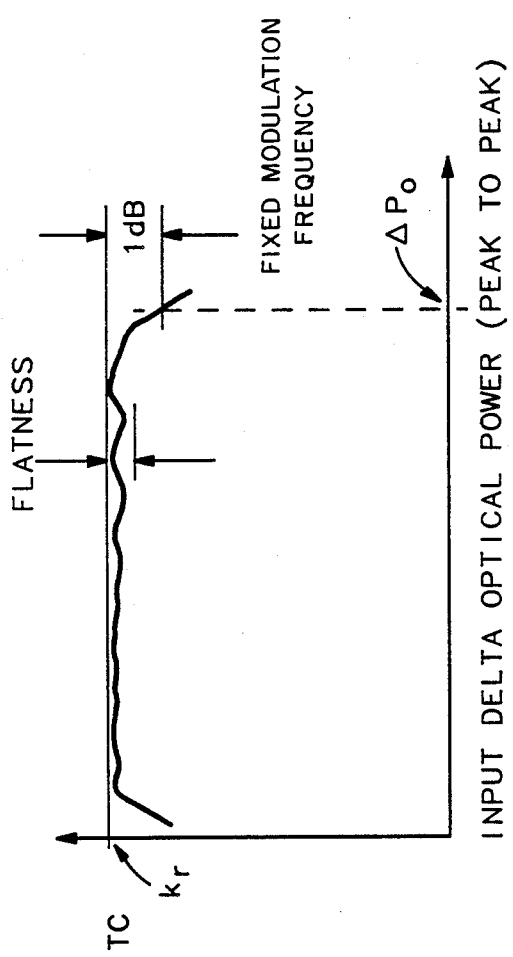
FIG. 5 illustrates measurement of responsivity versus power for an opto-electrical DUT.

To perform the measurement on the DUT, the DUT is substituted for the calibrated lightwave receiver 16, as shown in FIG. 2. A display of receiver responsivity versus modulation frequency is then obtained, as shown in FIG. 4. The information obtained from the display provided by the CRT 18 is the absolute receiver responsivity in amperes per watt (in a 50-ohm impedance system), the modulation bandwidth of the DUT, and the responsivity variation from a constant level over the modulation frequency range (or responsivity variation over modulation frequency).

Figure 8:
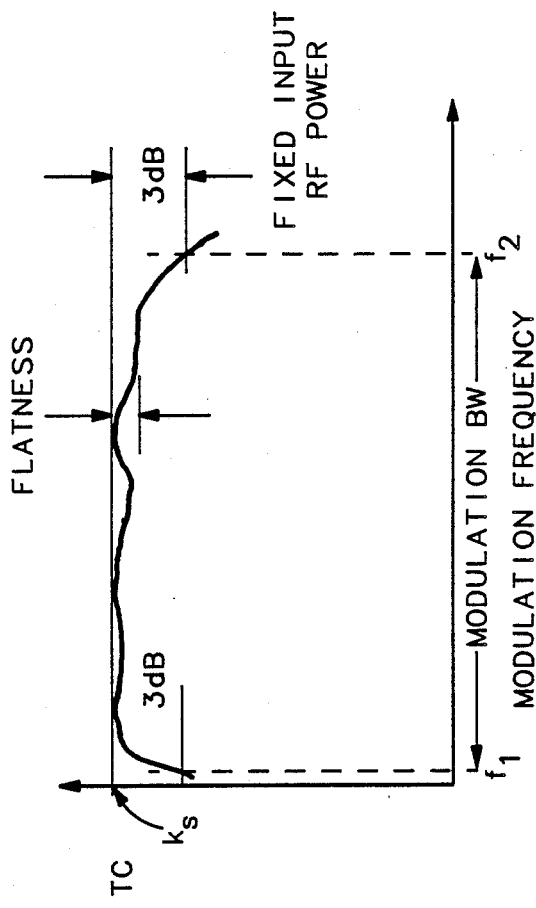
FIG. 8 illustrates measurement of responsivity versus modulating frequency for an electro-optical DUT.

The corresponding measurements can be performed for sources or electro-optical devices. The measurement block diagram is shown in FIG. 3, and the corresponding display is shown in FIG. 8. For the source case, the responsivity is in terms of watts per ampere; other comments made for the receiver apply for these measurements.

Figure 11:
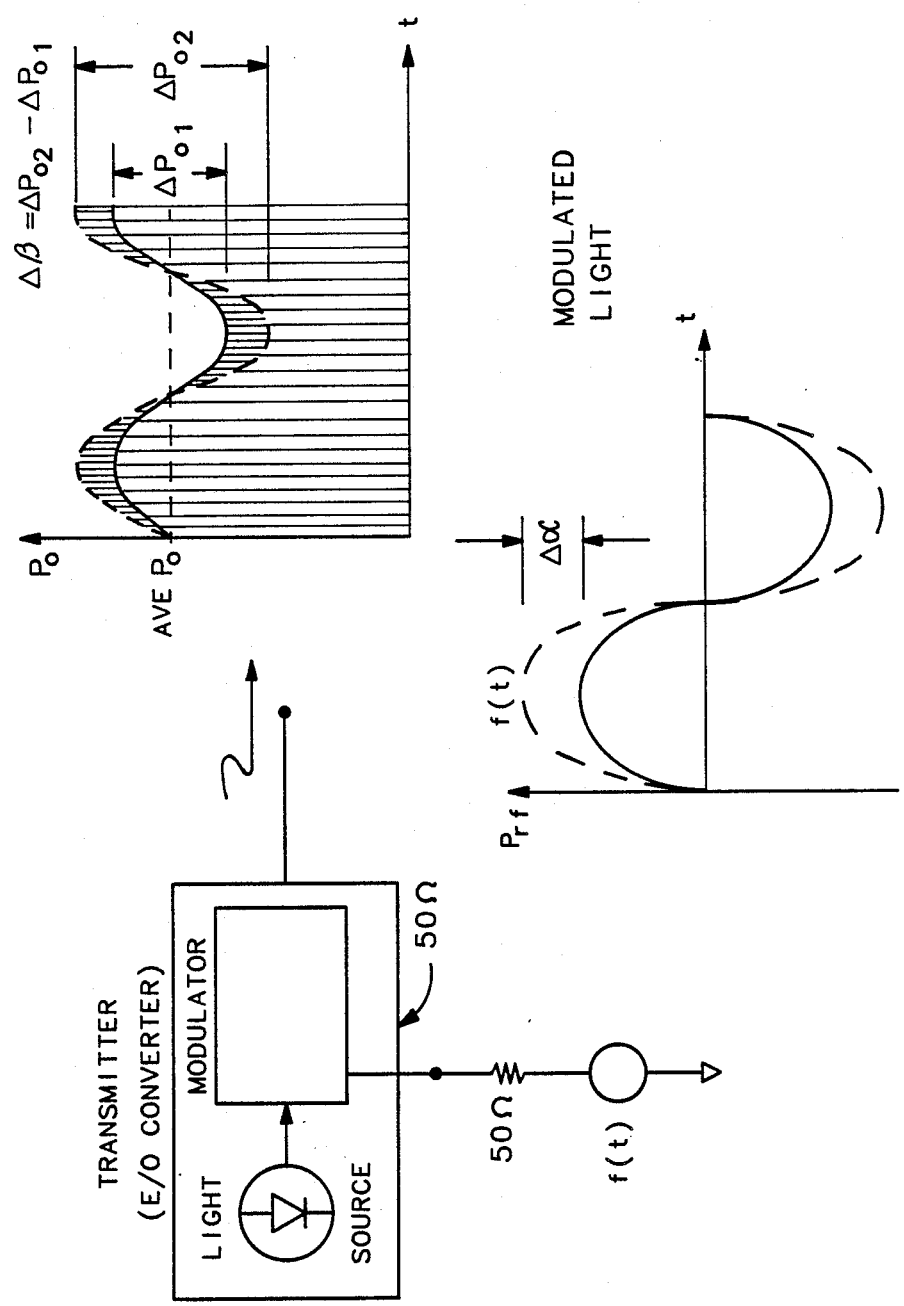
FIG. 11 illustrates measurement of the modulation power linearity performance for an electro-optical DUT.

Considered in more detail, one parameter set is the modulation bandwidth measurement for a demodulator (or receiver). The modulator lightwave (or carrier) frequency is fixed, for example, at 1300 nm, and the modulation frequency is varied over some frequency range, such as 300 kHz to 3 GHz, by the modulation source 20, such as an RF signal source. The lightwave source 14 outputs an amplitude modulated lightwave, where the lightwave is a constant frequency, but the modulation frequency varies over some frequency range, as shown in FIG. 11.

Figure 7:
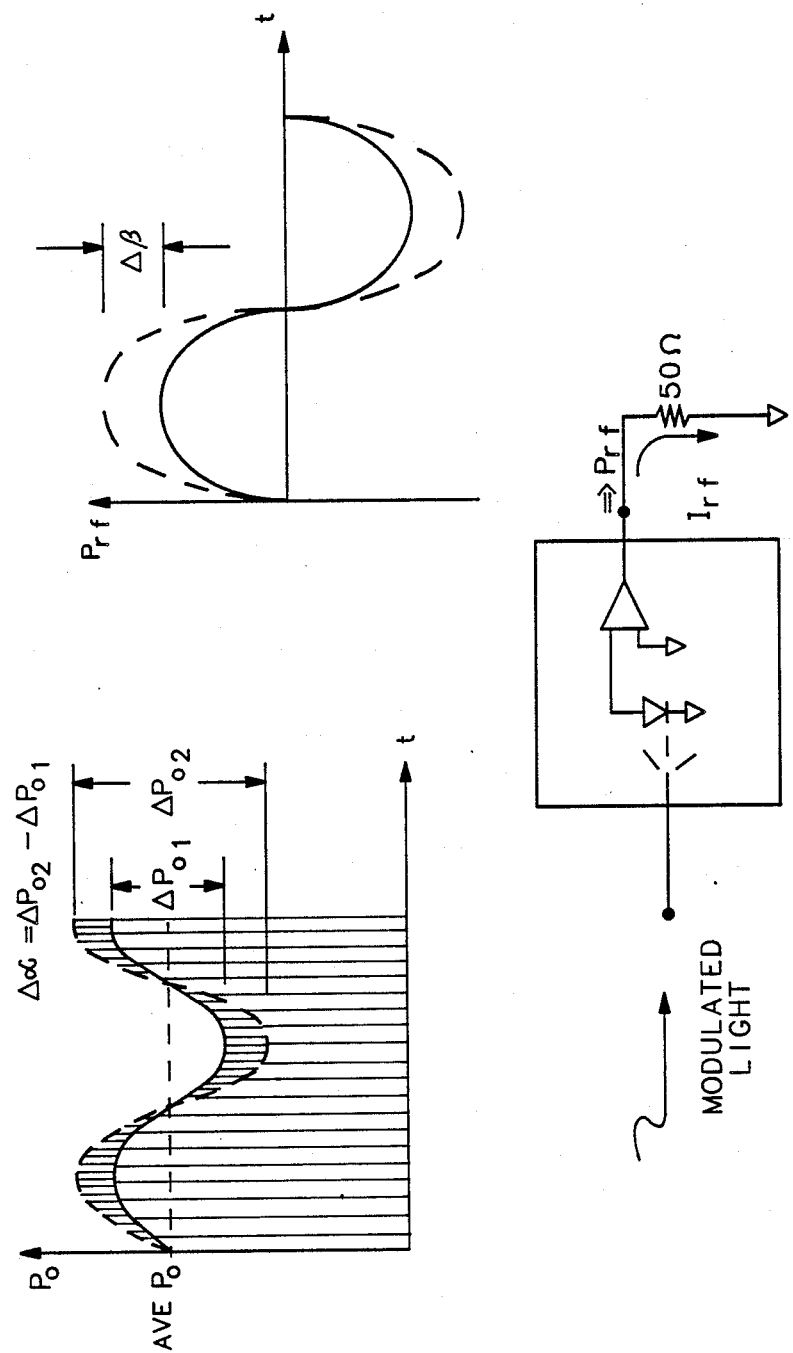
FIG. 7 illustrates measurement of the modulation power linearity performance for an opto-electrical DUT.

The demodulator (or receiver), typically a photodiode and pre-amp, strips away the carrier frequency and recovers the modulated signal, g(w), as shown in FIG. 7. The lightwave component analyzer 12 forms the ratio of g/f for each modulation frequency and operates on that ratio (g/f), as shown in FIG. 2 (see FIG. 3 for modulators (or sources)), and displays the transfer characteristic versus modulation frequency, as shown in FIG. 4 (see FIG. 8 for modulators (or sources)).

As the response of g/f decreases from $k_r$ by a prescribed amount, an upper frequency of operation, $f_2$, is defined, as shown in FIG. 4 (see FIG. 8 for modulators (or sources)). If either an unknown demodulator (or modulator), i.e., the DUT, were substituted for the calibrated standard or known demodulator (or modulator), respectively, in the lightwave component measurement 10 system shown in FIG. 2 (see FIG. 3 for modulators (or sources)), and $f_2$ were measured, then the modulation bandwidth of the DUT becomes $f_2-f_1$, as shown in FIG. 4 (see FIG. 8 for modulators (or sources)). Note that $k_r$ is the responsivity slope of the DUT at an average power level in the linear region of operation of the DUT.

Another set of measurements is demodulator (or receiver) sensitivity (responsivity) versus delta optical power measurements. The measurement block diagrams are also shown in FIGS. 2 and 3. In this case, the lightwave component analyzer 12 is set at a single modulation frequency, for example, 100 MHz. The modulation source 20 is varied over a selected power level range, for example, 20 dB change in RF modulation power. This 20 dB of RF source modulation power change results in a 10 dB delta optical power change that the lightwave source 14 transmits to the DUT. This measurement characterizes the modulation power linearity performance of the DUT over a range of delta optical powers, in this case, over 10 dB change in delta optical power which is defined as the peak-to-peak delta optical power.

The first step in the measurement process is to connect the calibrated lightwave receiver 16 in place of the DUT, as shown in FIG. 2. After the modulation frequency and appropriate modulation power ranges are set, the lightwave component analyzer 12 stores the calibration data. The DUT is then connected, as shown in FIG. 2, and the resultant display shows responsivity versus delta optical power for the modulation power range selected. The display provided by the CRT 18 shows the linearity of the DUT (see FIG. 5).

Figure 9:
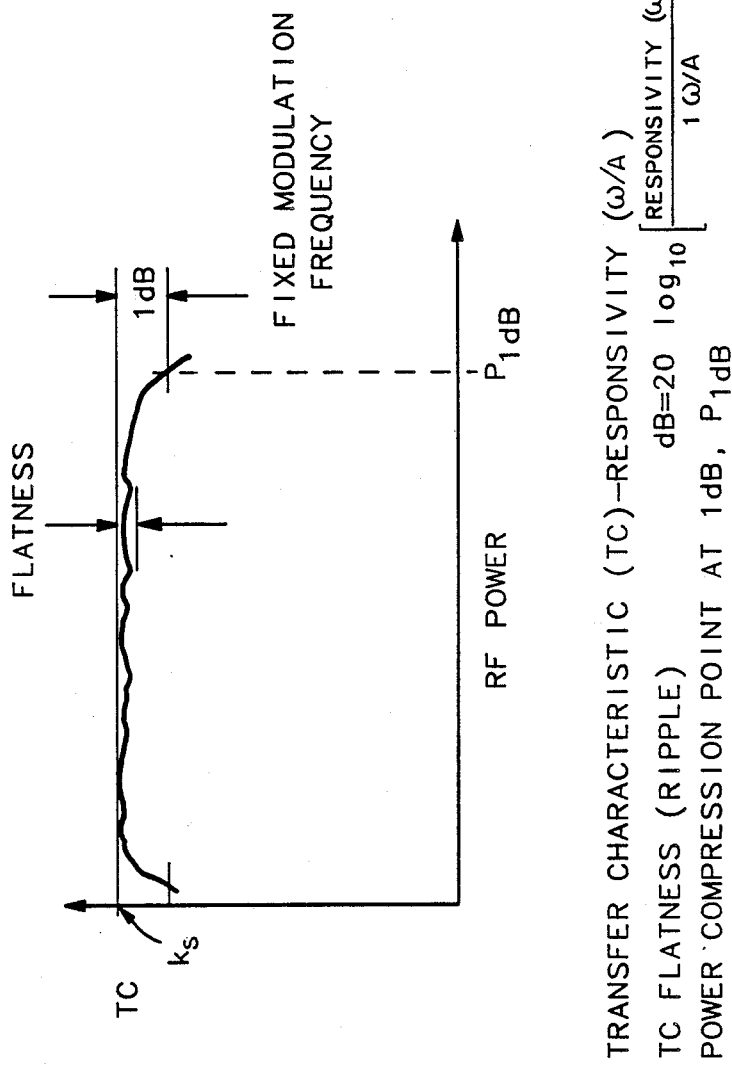
FIG. 9 illustrates measurement of responsivity versus power for an electro-optical DUT.

The corresponding measurement of responsivity versus RF modulation power for modulators (or sources) can be performed in similar fashion. FIG. 3 shows the measurement block diagram, and FIG. 9 shows the linearity display of responsivity versus RF modulation input power.

An additional set of measurements is demodulator (or receiver) or modulator (or source) RF modulation power versus delta optical power measurements. The same measurement block diagrams are applicable (see FIGS. 2 and 3). The lightwave component analyzer 12 has a measurement calibration sequence which uses the calibration data of the calibrated lightwave receiver 16 or the lightwave source 14, depending upon the measurement, to establish the measurement reference planes at the input and output ports of the DUT, respectively.

Figure 6:
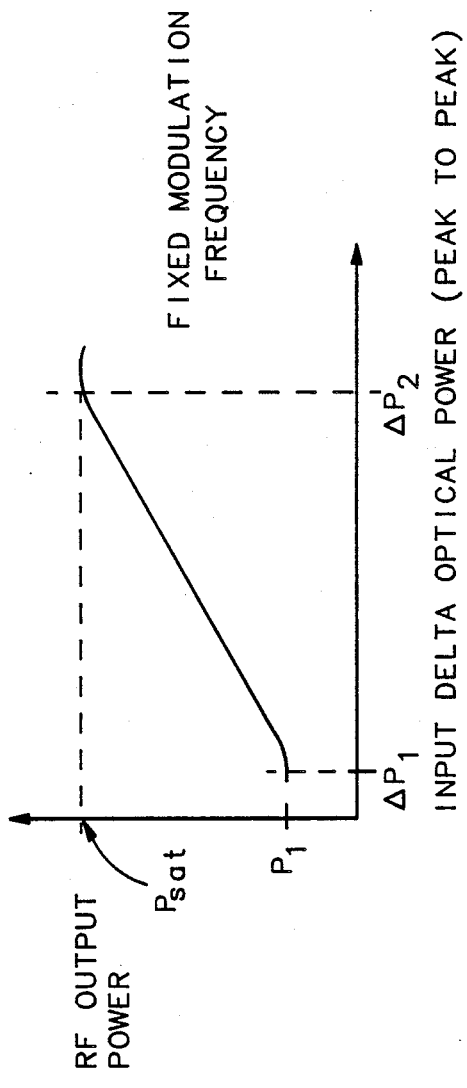
FIG. 6 illustrates measurement of sensitivity of an opto-electrical DUT.

In the case of a demodulator (or receiver), when the DUT is placed in the measurement block diagram, as shown in FIG. 2, the display provided by the CRT 18 shows RF demodulation power versus input delta optical power, where the delta optical power is defined in terms of its peak-to-peak optical power, as shown in FIG. 6. The useful information shown is the RF demodulation power compression characteristics of the DUT, i.e., the region of delta optical powers where the behavior of the DUT changes from a linear to a non-linear behavior.

Figure 10:
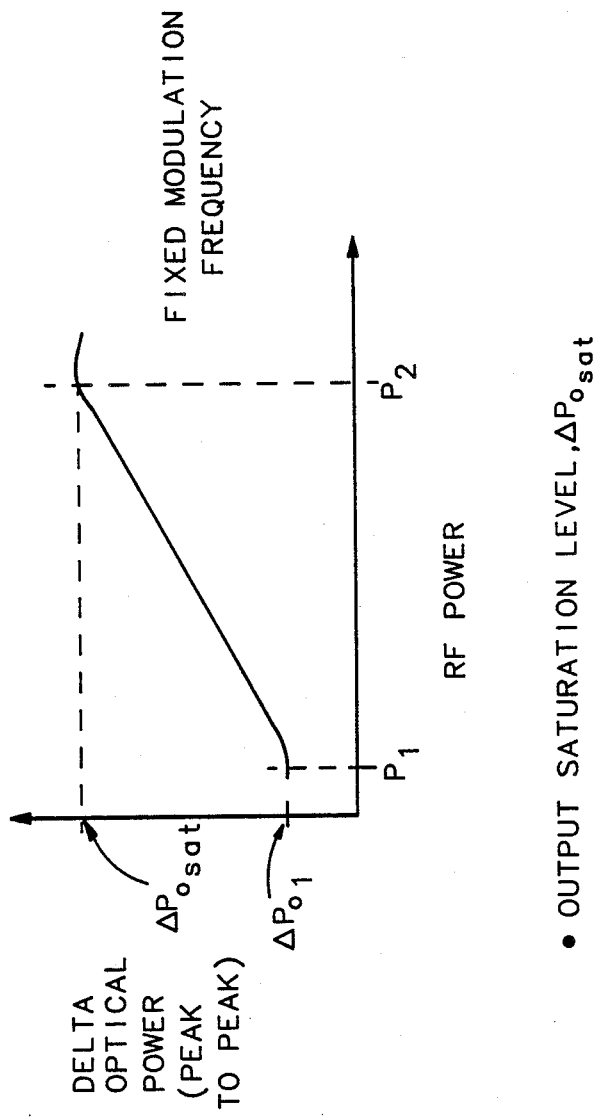
FIG. 10 illustrates measurement of sensitivity of an electro-optical DUT.

FIG. 3 shows the measurement block diagram where electro-optical, rather than opto-electrical, devices can be measured. This measurement is performed in similar fashion as that discussed for the case of a demodulator (or receiver). In the case of a modulator (or source), the display provided by the CRT 18 is delta optical power versus RF modulation power, as shown in FIG. 10.

Considered in more detail, the parameter set of sensitivity, dynamic range, and compression for modulators or demodulators is measured at a constant modulation frequency, $f_m$, between $f_1$ and $f_2$, and with the power of f(w) varying from some small threshold value, $P_1$, to some compression or upper value, $P_2$. FIG. 6 shows RF output power versus input delta optical power for demodulators (or receivers) at a fixed modulation frequency. The output saturation level ($P_{sat}$) and dynamic range ($P_{sat}-P_1$) are shown in FIG. 6. FIG. 10 shows delta optical power versus RF power for modulators (or sources) at a fixed modulation frequency. The output saturation level (delta $P_{osat}$) and dynamic range (delta $P_{osat}$-delta $P_{o1}$) are shown in FIG. 10.

The following pages contain a copy of the firmware code stored in the ROM of the lightwave component analyzer 12, which is executed to perform the calibration method in accordance with the embodiment of the invention shown in FIG. 12. The firmware code on pages 22-27 contains the routines for loading calibration data from disc, as indicated by the step 36, or entering coefficients for curve fit, as indicated by the step 38. Pages 28-29 contain the firmware code relating to the routine for measuring the calibration standard, as indicated by the step 42. The firmware code on pages 30–35 contains the routine for computing error correction data, as indicated by the step 44. Finally, page 36 contains the firmware code for correcting measurements using the error correction data, as indicated by the step 50.

```
#EJECT;
COMMENT                                                    -                        loadcs_ext
****************************************************************
*   Load cal'ed source data file from external memory
****************************************************************
;
PROCEDURE loadcs_ext( src );
   VALUE src; INTEGER src;                                                ENTRY;
BEGIN
   INTEGER
           dummy1,
           dummy2,
             nbyte;
   DOUBLE bufadr;
   ALPHA fname;
   INTEGER CONSTANT disc_title_len := 10;
   BYTE ARRAY fnm_str[-1:disc_title_len];
   BYTE POINTER fstr = fname;
   REAL POINTER std_coeff,
                cmos_ptr,
                hd_ptr;

h_off( Cload_cs1, Cload_cs5 );

STPNTR( fstr, ADRS( fnm_str ));
   fstr[-1] := disc_title_len;

MOVE fstr := ext_src_title[src, 0], +(reg_title_size + 1);
   app_ch( fname, 'C );   & attach for Cal'ed Receiver &
   app_ch( fname, 'S );
   IF fopen( fname, -1, dummy1, dummy2, BDAT ) THEN
   BEGIN abort_swp;
      nbyte := cs_ext_kit_size;
      bufadr := ADRS( cmos_top ) - cal_kit_size-4 - cr_ext_kit_size
                                                 - cs_ext_kit_size;
      IF NOT read_bfile( fname, bufadr, nbyte ) THEN
        warn( no_reg )
       ELSE
         BEGIN
         COMMENT transfer disc data to stds array;
         STPNTR( std_coeff, ADRS(cal_kit_ary[0]) + std_def_1 +
                                         (std_d_src-1)*std_size );
         STPNTR( hd_ptr, bufadr + 2 );
         COMMENT set cmos_ptr to beginning of std_d_src;
         STPNTR( cmos_ptr, ADRS( cmos_top ) - (src_kit_size + 4) );
         std_coeff[f_min_index] := hd_ptr[disc_f_min];
         cmos_ptr[f_min_index] := hd_ptr[disc_f_min];
         std_coeff[f_max_index] := hd_ptr[disc_f_max];
         cmos_ptr[f_max_index] := hd_ptr[disc_f_max];
         std_coeff[delay_index] := hd_ptr[disc_delay];
         cmos_ptr[delay_index] := hd_ptr[disc_delay];
         END;
      h_key( Cload_cs1+src-1, Cload_cs1, Cload_cs5 );
      resume_swp;
   END
   ELSE warn( no_reg );
COMMENT
      IF instruct_on THEN
         gen_menu( LOADg_SRC_MENU )
       ELSE
         gen_menu( LOAD_SRC_EXT_MENU );

END loadcs_ext;
```

```
;
PROCEDURE loadcr_ext( rcvr );
    VALUE rcvr; INTEGER rcvr;                                          ENTRY;
BEGIN
    INTEGER
            dummy1,
            dummy2,
            nbyte;
    DOUBLE bufadr;
    ALPHA fname;
    INTEGER CONSTANT disc_title_len := 10;
    BYTE ARRAY fnm_str[-1:disc_title_len];
    BYTE POINTER fstr = fname;
    REAL POINTER std_coeff,
                 cmos_ptr,
                 hd_ptr;

h_off( Cload_cr1, Cload_cr5 );

STPNTR( fstr, ADRS( fnm_str ));
    fstr[-1] := disc_title_len;

MOVE fstr := ext_rcvr_title[rcvr, 0], +(reg_title_size + 1);
    app_ch( fname, 'C );   & attach for Cal'ed Receiver &
    app_ch( fname, 'R );
    IF fopen( fname, -1, dummy1, dummy2, BDAT ) THEN
    BEGIN abort_swp;
       nbyte := cr_ext_kit_size;
       bufadr := ADRS( cmos_top ) - cal_kit_size-4 - cr_ext_kit_size;
       IF NOT read_bfile( fname, bufadr, nbyte ) THEN
          warn( no_reg )
        ELSE
          BEGIN
          COMMENT transfer disc parameters to stds array;
          STPNTR( std_coeff, ADRS(cal_kit_ary[0]) + std_def_1 +
                                         (std_d_rcvr-1)*std_size );
          STPNTR( hd_ptr, bufadr+2 );     & Add two to get on x4 &
          COMMENT set cmos_ptr to beginning of std_d_rcvr;
          STPNTR( cmos_ptr, ADRS( cmos_top ) - (rcvr_kit_size +
                                            src_kit_size + 4 ) );
          std_coeff[f_min_index] := hd_ptr[disc_f_min];
          cmos_ptr[f_min_index] := hd_ptr[disc_f_min];
          std_coeff[f_max_index] := hd_ptr[disc_f_max];
          cmos_ptr[f_max_index] := hd_ptr[disc_f_max];
          std_coeff[delay_index] := hd_ptr[disc_delay];
          cmos_ptr[delay_index] := hd_ptr[disc_delay];
          END;
       h_key( Cload_cr1+rcvr-1, Cload_cr1, Cload_cr5 );
       resume_swp;
       COMMENT
          IF instruct_on THEN
             gen_menu( LOADg_RCVR_MENU
          ELSE
             gen_menu( LOAD_RCVR_EXT_MENU );

END loadcr_ext;

&112 a coefficient  &   enter_active_cal_std( a_coeff_offset );
    &113 b coefficient  &   enter_active_cal_std( b_coeff_offset );
    &114 c coefficient  &   enter_active_cal_std( c_coeff_offset );
    &115 d coefficient  &   enter_active_cal_std( d_coeff_offset );
    &116 e coefficient  &   enter_active_cal_std( e_coeff_offset );
    &117 f coefficient  &   enter_active_cal_std( f_coeff_offset );
    &118 g coefficient  &   enter_active_cal_std( g_coeff_offset );
    &119 h coefficient  &   enter_active_cal_std( h_coeff_offset );
    &120 i coefficient  &   enter_active_cal_std( i_coeff_offset );
```

```
COMMENT                                                    enter_active_cal_std
*****************************************************************************
*
*****************************************************************************
;
PROCEDURE  enter_active_cal_std( offset );
   VALUE   offset;
   INTEGER offset;
   BEGIN & enter_active_cal_std &
      REAL active_fcn_real;
      REAL POINTER rptr;

STPNTR( rptr, cal_std_addr + offset );
      rptr := unscale_multiplier * REAL(act_fcn_val);

END;  & enter_active_cal_std &

& std # 12 &
REAL     TABLE a12 := 300@3, 3@9,                         & fmin, fmax &
                     0.0,0.0,0.0,                         &            &
                     0.0,0.0,0.0,0.0;                     &            &
BYTE     TABLE c12 := 10,9,'R,'E,'C,'E,'I,'V,'E,'R,' ,' ; & label &
BYTE     TABLE d12 := std_d_rcvr , 0;                     & std_type, type2&
& std # 13 &
REAL     TABLE a13 := 0,999@9,                            & fmin, fmax &
                     1.0,0.0,0.0,                         &A, B, C    &
                     0.0,0.0,0.0,0.0;                     &D, E, F, G&
BYTE     TABLE c13 := 10,9,'R,'E,'C,'E,'I,'V,'E,'R,' ,' ; & label &
BYTE     TABLE d13 := std_u_rcvr , 0;                     & std_type, type2&
& std # 14 (std # 13 continued ) &
BYTE     TABLE aa14 := 0, 0;                              & place holder   &
REAL     TABLE a14 := 0.0,0.0,                            & H, I      &
                     0.0, 0.0, 0.0,                       &           &
                     0.0,0.0,0.0,0.0;                     &           &
BYTE     TABLE c14 := 10,9,'R,'E,'C,'E,'I,'V,'E,'R,' ,' ; & label &
& std # 15 &
REAL     TABLE a15 := 300@3, 3@9,                         & fmin, fmax &
                     0.0,0.0,0.0,                         &            &
                     0.0,0.0,0.0,0.0;                     &            &
BYTE     TABLE c15 := 10,6,'S,'O,'U,'R,'C,'E,' ,' ,' ,' ; & label &
BYTE     TABLE d15 := std_d_src,  0;                      & std_type, type2&
& std # 16 &
REAL     TABLE a16 := 0,999@9,                            & fmin, fmax &
                     1.0,0.0,0.0,                         &A, B, C    &
                     0.0,0.0,0.0,0.0;                     &D, E, F, G&
BYTE     TABLE c16 := 10,6,'S,'O,'U,'R,'C,'E,' ,' ,' ,' ; & label &
BYTE     TABLE d16 := std_u_src,  0;                      & std_type, type2&
& std # 17 ( std # 16 continued ) &
BYTE     TABLE aa17 := 0, 0;                              & place holder   &
REAL     TABLE a17 := 0.0,0.0,                            & H, I      &
                     0.0, 0.0, 0.0,                       &           &
                     0.0,0.0,0.0,0.0;                     &           &
BYTE     TABLE c17 := 10,6,'S,'O,'U,'R,'C,'E,' ,' ,' ,' ; & label &

;
PROCEDURE take_data;
   BEGIN & take_data &
   BOOLEAN is_sliding, std_in_band;
   REAL    fmin, fmax;
   INTEGER class, iclass, pt_start, pt_stop ;
   INTEGER temp;

IF cal_mem_allocated THEN

BEGIN & if cal_mem_allocated &
      is_sliding := TBIT( std_measd( fmin, fmax, class ) , load_bit);

IF cal_type = one_port_on_2 THEN class := class - port_offset;
      IF cal_type = response       THEN class := 0;
```

```
IF class >= two_term_response_std AND class < src_cable_std THEN
    iclass := two_term_offset_std - class
ELSE IF class >= src_cable_std THEN
    iclass := class - src_cable_std
  ELSE
    iclass := class;

std_in_band    :=   TRUE;
IF ( iclass   > (cal_arrays[ cal_type ] - 1) ) OR  ( iclass   <   0 )
                                    THEN std_in_band:=FALSE;
                            & detection of invalid cal cmd&
IF e_ch_quad( ch_frequency_span ) = 0 THEN
    BEGIN
      pt_start := 0;
      pt_stop := num_mpts[ curr_e_ch ] - 1;
    END
ELSE
    BEGIN
      pt_start   :=  pt_at_freq( QUAD( fmin ) );
      pt_stop    :=  pt_at_freq( QUAD( fmax ) );
    END;
            & the following is to make sure take_data banding
                agrees  with standard_specs in std_act
                problems when buckets step < 1 Hz       &

IF NOT(fmin <= REAL(e_freq_at_pt(pt_start)))
    THEN IF pt_start < num_mpts[ curr_e_ch ] THEN
            pt_start := pt_start + 1
         ELSE std_in_band := FALSE;

IF NOT(fmax >= REAL(e_freq_at_pt(pt_stop)))
    THEN    IF pt_stop >  0    THEN     pt_stop  := pt_stop  - 1
                               ELSE std_in_band := FALSE;

pt_count   := pt_stop - pt_start + 1;

IF ( pt_count >  0 )   AND   std_in_band   THEN
    BEGIN
    data_source  :=dp_raw_base[curr_e_ch,  generic_param ]
            + DOUBLE(   pt_start * user3_length );

data_destination := calco_adr
            + DOUBLE( iclass ) * DOUBLE( e_ary_size )
                + DOUBLE (pt_start * user3_length );

IF is_sliding THEN
        load_slid
    ELSE
        BEGIN copy_user3( data_source, data_destination, pt_count );
        h_last_element;
        END;
    END pt_count > 0
ELSE  BEGIN
        pt_count := 0;
        h_last_element;
        END;

IF freq_covered OR is_sliding THEN
    BEGIN
        IF is_sliding THEN
            BEGIN
            IF pt_count <= 0 THEN num_slides := min_num_of_slides;
            IF num_slides < min_num_of_slides
                THEN tell( slide_load)
                ELSE   tell_press_done;
            END;
```

```
            cal_stds_remaining := RBIT( cal_stds_remaining, class );
            last_class := class;
         END
      ELSE tell_connect_std;

END;   & if cal_mem_allocated &

END;   & take_data &
COMPLEX PROCEDURE std_act_rcvr( freq, class );
   VALUE freq, class;
   REAL freq;
   INTEGER class;

BEGIN
   INTEGER type;
   REAL freq_rad,A,B,C,D,E,F,G,H,I;
   COMPLEX numerator, denominator;
   COMPLEX result, exp;
   REAL POINTER std_coeff;
   BYTE POINTER std_type = std_coeff;
   QUAD fstart,fspan;

STPNTR( std_coeff, standard_specs( freq, class ) );
   type := std_type[ type_index ];

freq_rad := TwoPi * freq;

IF type = std_d_rcvr THEN
      BEGIN  & disc receiver standard &
      fstart := QUAD( std_coeff[f_min_index] );
      fspan  := QUAD( std_coeff[f_max_index] ) - fstart;
      interp_alg( ADRS(cmos_top) - (cal_kit_size+4) - cr_ext_data_size,
                  ADRS( result ), num_cr_pts, 1, (QUAD(freq) - fstart),
                  0, fspan );
      B := (std_coeff[delay_index]*unscale_Bcoeff);
      ASSEMBLE(  MOVEM.L   result,R0/R1;
                 JSRX      CNVE1;
                 MOVEM.L   R0/R1,result );
      result := result * exp_cmplx( COMPLEX( 0.0, B*freq_rad ) );
      END
   ELSE
      BEGIN   & user receiver standard &
      A := std_coeff[a_coeff_index];
      B := (std_coeff[b_coeff_index]*unscale_Bcoeff);
      C := std_coeff[c_coeff_index]*unscale_Ccoeff;
      D := std_coeff[d_coeff_index]*unscale_Dcoeff;
      E := std_coeff[e_coeff_index]*unscale_Ecoeff;
      F := std_coeff[f_coeff_index]*unscale_Fcoeff;
      G := std_coeff[g_coeff_index]*unscale_Gcoeff;
      H := std_coeff[h_coeff_index]*unscale_Hcoeff;
      I := std_coeff[i_coeff_index]*unscale_Icoeff;

&    A * exp( -j*w*B ) * (1-D*w*w) + j*w*(E-C*w*w)    &
      numerator := std_coeff[a_coeff_index] *
         exp_cmplx( COMPLEX( 0.0, B*freq_rad ) )*
         COMPLEX( (1.0 - D*freq_rad*freq_rad ),
                  (freq_rad*(E-C*freq_rad*freq_rad)) );

&   ( 1 - w*w*(H - F*w*w) ) + j*w*(E - G*w*w)   &
      denominator :=
         COMPLEX( (1.0 - freq_rad*freq_rad*(H-F*freq_rad*freq_rad)),
                  (freq_rad*(I - G*freq_rad*freq_rad) ) );

result := numerator / denominator;
      END;

std_act_rcvr := result;
END;
```

```
#EJECT;
COMPLEX PROCEDURE std_act_src( freq, class );
   VALUE freq, class;
   REAL freq;
   INTEGER class;                                                    ENTRY;

BEGIN
   INTEGER type;
   REAL freq_rad,A,B,C,D,E,F,G,H,I;
   REAL skin_factor, delay, z_mech;
   COMPLEX numerator, denominator;
   COMPLEX result, exp;
   COMPLEX skin_cpx;
   REAL POINTER std_coeff;
   BYTE POINTER std_type = std_coeff;
   QUAD fstart,fspan;

STPNTR( std_coeff, standard_specs( freq, class ) );
   type := std_type[ type_index ];

freq_rad := TwoPi * freq;

IF type = std_d_src THEN
      BEGIN  & disc source standard &
      fstart := QUAD( std_coeff[f_min_index] );
      fspan  := QUAD( std_coeff[f_max_index] ) - fstart;
      interp_alg( ADRS(cmos_top) - (cal_kit_size+4) - cr_ext_kit_size
                                                   - cs_ext_data_size,
                  ADRS( result ), num_cr_pts, 1, (QUAD(freq) - fstart),
                  0, fspan );
      B := (std_coeff[delay_index]*unscale_Bcoeff);
      ASSEMBLE(  MOVEM.L    result,R0/R1;
                 JSRX       CNVE1;
                 MOVEM.L    R0/R1,result );
      result := result * exp_cmplx( COMPLEX( 0.0, B*freq_rad ) );
      END
   ELSE IF type = std_u_src THEN
      BEGIN  & user polynomial source standard &
      A := std_coeff[a_coeff_index];
      B := (std_coeff[b_coeff_index]*unscale_Bcoeff);
      C := std_coeff[c_coeff_index]*unscale_Ccoeff;
      D := std_coeff[d_coeff_index]*unscale_Dcoeff;
      E := std_coeff[e_coeff_index]*unscale_Ecoeff;
      F := std_coeff[f_coeff_index]*unscale_Fcoeff;
      G := std_coeff[g_coeff_index]*unscale_Gcoeff;
      H := std_coeff[h_coeff_index]*unscale_Hcoeff;
      I := std_coeff[i_coeff_index]*unscale_Icoeff;

&   A * exp( -j*w*B ) * (1-D*w*w) + j*w*(E-C*w*w)    &
      numerator := std_coeff[a_coeff_index] *
         exp_cmplx( COMPLEX( 0.0, B*freq_rad ) )*
         COMPLEX( (1.0 - D*freq_rad*freq_rad ),
                  (freq_rad*(E-C*freq_rad*freq_rad)) );

&  ( 1 - w*w*(H - F*w*w) ) + j*w*(E - G*w*w)   &
      denominator :=
         COMPLEX( (1.0 - freq_rad*freq_rad*(H-F*freq_rad*freq_rad)),
                  (freq_rad*(I - G*freq_rad*freq_rad) ) );

result := numerator / denominator;
      END
   ELSE
      BEGIN   & user thru/receiver source standard &
      delay := std_coeff[ delay_index ];

result := 0.0;
```

```
     IF delay <> 0 THEN
        BEGIN   & COAX ONLY &
        z_mech := std_coeff[ z0_index ];
        skin_factor := std_coeff[ loss_index ]/
                       (SQRT( freq_rad ) * z_mech * skin_coeff );
        result :=
          exp_cmplx( COMPLEX( 0.0, -delay * freq_rad ) * skin_cpx );
        END
      ELSE
         result := COMPLEX( 1.0 , 0.0 );
      result := result / rcvr_model( freq );
     END;

std_act_src := result;
  END;
#EJECT;
COMPLEX PROCEDURE std_act( freq, class );
   VALUE freq, class;
   REAL freq;
   INTEGER class;
   BEGIN
   IF meas_domain = 3 THEN std_act := std_act_elec( freq, class )
   ELSE IF meas_domain = 0 THEN std_act := std_act_opt( freq, class )
   ELSE IF meas_domain = 1 THEN std_act := std_act_rcvr( freq, class )
   ELSE IF meas_domain = 2 THEN std_act := std_act_src( freq, class )
   ELSE std_act := std_act_elec( freq, class );
   END;
PROCEDURE compute_freq_resp_coeff;
BEGIN
DOUBLE add,
       iadd;
INTEGER index;
COMPLEX coeff, meas ;
    add := calco_adr;

FOR index := 0 UNTIL num_mpts[ curr_e_ch ] - 1 DO
          BEGIN

ASSEMBLE(MOVE.L add     ,R8;
                   JSR fetch_CNVE1;
                   MOVEM.L R0-R1,meas );

coeff:=meas/ std_act( REAL( e_freq_at_pt( index ) ),
                                      freq_resp_std );

ASSEMBLE(MOVE.L  add,        R8;
                   MOVEM.L coeff,   R0-R1;    JSR CNV1E_save );

add := add + user3_length;

END loop;
      clr_msg_and_in_progress;
   END;
freq_resp EQU *
   MOVE.L     dp_correct_ptr(R11),R13
   MOVE.L     R13,   R8
   ADD.W      #6,    R13
   MOVE.L     R13,dp_correct_ptr(R11)
   JMP        DIVE_ptr
*
```

```
* comp_datap
*
*  R11 must be preloaded with a ch ptr base
*  R12 must be preloaded with a ch var base
*
*       Data in memory  |  Imag  |  16 bits
*                       |  Real  |  16 bits
*                       |xxx|Exp |   8 bits -- first 8 bits don't care
*
update_raw_loop EQU *
comp_datap EQU *
  MOVE.L      dp_raw_get(R11),R10
  MOVE.L      (R10)+,R0
  MOVE.W      (R10)+,R1
  AND.W       =HFF, R1
  MOVE.L      R10,dp_raw_get(R11)              restore ptr
*
correct_math EQU *
  MOVE.L      dp_correct_sw(R12),R10
  JSR         (R10)                            R10 = freq_resp
store_in_d EQU *
  MOVE.L      dp_d_ptr(R11),R10                stash into d
  MOVE.L      R0,(R10)+
  MOVE.W      R1,(R10)+
  MOVE.L      R10,dp_d_ptr(R11)
*
*
```

The foregoing description is offered primarily for purposes of illustration. It will be readily apparent to those skilled in the art that numerous modifications and variations not mentioned above can still be made without departing from the spirit and scope of the invention as claimed below.

What is claimed is:

1. A method for calibrating a lightwave component measurement system for performing test measurements on a device under test, comprising the steps of:
providing a lightwave source, the lightwave source having known electro-optical characteristics;
providing a lightwave receiver, the lightwave receiver having known opto-electrical characteristics;
selecting the lightwave source as a calibration reference based on the known characteristics of the lightwave source, when the lightwave component measurement system is to be used to characterize an electro-optical device under test;
alternatively selecting the lightwave receiver as a calibration reference based on the known characteristics of the lightwave reciever, when the lightwave component measurement system is to be used to characterize an opto-electrical device under test;
providing data specifying the known electro-optical response characteristics of the lightwave source, when the lightwave source is selected as the calibration reference;
providing data specifying the known opto-electrical response characteristics of the lightwave receiver, when the lightwave receiver is selected as the calibration reference;
performing a measurement wherein an optical signal produced by the lightwave source in response to a first electrical signal at an output of an electrical signal source included in the lightwave component measurement system is detected by the lightwave receiver which produces a second electrical signal coupled to an input of a tuned receiver included in the lightwave component measurement system;
producing electro-optical error correction data by factoring out of the response represented by the second electrical signal the data specifying the known response characteristics of the lightwave source, when the lightwave source is selected as the calibration reference; and
alternatively producing opto-electrical error correction data by factoring out of the response represented by the second electrical signal the data specifying the known response characteristics of the lightwave receiver, when the lightwave receiver is selected as the calibration reference.

2. The method of claim 1, further comprising the steps of:
substituting an electro-optical device under test for the lightwave source;
alternatively substituting an opto-electrical device under test for the lightwave receiver;
performing a measurement on the device under test;
using the electro-optical error correction data, when an electro-optical characteristic of the electro-optical device under test is measured; and
using the opto-electrical error correction data, when an opto-electrical characteristic of the opto-electrical device under test is measured.

3. The method of claim 1, further comprising the step of storing the error correction data in a lightwave component analyzer.

4. A method for calibrating absolute and relative measurements of at least one of a modulation and demodulation transfer characteristic of electro-optical and opto-electrical devices under test during setup of a lightwave component measurement system for characterizing performance of fiber optic systems and associated components, comprising the steps of:
providing a lightwave source, the lightwave source having known electro-optical characteristics;
providing a lightwave receiver, the lightwave receiver having known opto-electrical characteristics;

selecting the lightwave source as a calibration reference based on the known characteristics of the lightwave source, when the lightwave component measurement system is to be used to perform measurements on an electro-optical device under test to characterize the performance of the device under test;

alternatively selecting the lightwave receiver as a calibration reference based on the known characteristics of the lightwave receiver, when the lightwave component measurement system is to be used to perform measurements on an opto-electrical device under test to characterize the performance of the device under test;

providing data specifying the known electro-optical response characteristics of the lightwave source, when the lightwave source is selected as the calibration reference;

providing data specifying the known opto-electrical response characteristics of the lightwave receiver, when the lightwave receiver is selected as the calibration reference;

performing a measurement wherein an optical signal produced by the lightwave source in response to a first electrical signal at an output of an electrical signal source included in the lightwave component measurement system is detected by the lightwave receiver which produces a second electrical signal coupled to an input of a tuned receiver included in the lightwave component measurement system;

producing electro-optical error correction data by dividing the response represented by the second electrical signal by the data specifying the known response characteristics of the lightwave source, when the lightwave source is selected as the calibration reference;

alternatively producing opto-electrical error correction data by dividing the response represented by the second electrical signal by the data specifying the known response characteristics of the lightwave receiver, when the lightwave receiver is selected as the calibration reference; and storing the error correction data in a lightwave component analyzer;

the error correction data being for later use when the device under test is substituted for its calibrated counterpart in the lightwave component measurement system and at least one of an electro-optical and opto-electrical characteristic of the device under test is measured.

5. The method of claim 4 wherein the at least one modulation and demodulation transfer characteristic is given in terms of the responsivity magnitude and phase versus modulation frequency.

6. The method of claim 4, further comprising the step of measuring responsivity versus modulating frequency for an opto-electrical device under test.

7. Thereto of claim 4, further comprising the step of measuring responsivity versus power for an opto-electrical device under test.

8. The method of claim 4, further comprising the step of measuring sensitivity of an opto-electrical device under test.

9. The method of claim 4, further comprising the step of measuring the modulation power linearity performance for an opto-electrical device under test.

10. The method of claim 4, further comprising the step of measuring responsivity versus modulating frequency for an electro-optical device under test.

11. The method of claim 4, further comprising the step of measuring responsivity versus power for an electro-optical device under test.

12. The method of claim 4, further comprising the step of measuring sensitivity of an electro-optical device under test.

13. The method of claim 4, further comprising the step of measuring the modulation power linearity performance for an electro-optical device under test.

14. A lightwave component measurement system incorporating calibration for absolute and relative measurements of at least one of a modulation and demodulation transfer characteristic of electro-optical and opto-electrical devices under test during setup of the lightwave component measurement system for characterizing performance of fiber optic systems and associated components, comprising:

a modulation source for generating a swept electrical signal;

a tuned vector receiver having an input port;

a lightwave source connected to the modulation source, the lightwave source including an electro-optical transducer for converting the swept electrical signal generated by the modulation source to an optical signal, the lightwave source having known electro-optical characteristics;

a lightwave receiver including an opto-electrical transducer for reconverting a received optical signal to an electrical signal, the lightwave receiver having known opto-electrical characteristics;

the electrical signal produced by the opto-electrical transducer included in the lightwave receiver being fed to the input port of the tuned vector receiver; and means for performing a measurement for establishing an initial calibration reference based on the known characteristics of the lightwave source and the lightwave receiver when the lightwave component measurement system is used to characterize at least one of an electro-optical device under test and an opto-electrical device under test to produce error correction data, comprising:

means for selecting the lightwave source as a calibration reference based on the known characteristics of the lightwave source, when the lightwave component measurement system is to be used to characterize an electro-optical device under test, and alternatively selecting the lightwave receiver as a calibration reference based on the known characteristics of the lightwave receiver, when the lightwave component measurement system is to be used to characterize an opto-electrical device under test;

means for providing data specifying the known electro-optical response characteristics of the lightwave source, when the lightwave source is selected as the calibration reference, and data specifying the known opto-electrical characteristics of the lightwave receiver, when the lightwave receiver is selected as the calibration reference;

wherein an optical signal produced by the lightwave source in response to the swept electrical signal is detected by the lightwave receiver which produces the electrical signal at the input port of the tuned vector receiver; and means for producing electro-optical error correction data by dividing the response represented by the second electrical signal by the data specifying the known response characteristics of the lightwave source, when the lightwave source is selected as the calibration reference, and alternatively producing opto-electrical error correction data by dividing the response represented by the second electrical signal by the data specifying the known response characteristics of the lightwave receiver, when the lightwave receiver is selected as the calibration reference.

15. The lightwave component measurement system of claim 14 wherein the device under test is substituted for its calibrated counterpart in the lightwave component measurement system, further comprising:

means for performing a measurement on the device under test; and means for compensating the measurement using the error correction data when the electro-optical or opto-electrical characteristics of the device under test are measured.

16. The lightwave component measurement system of claim 14, further comprising means for storing the error correction data.

17. The lightwave component measurement system of claim 14 configured for calibrating opto-electrical test measurements.

18. The lightwave component measurement system of claim 14 configured for calibrating electro-optical test measurements.

19. The lightwave component measurement system of claim 14 wherein the modulation source generates a 300 kHz to 3 GHz electrical signal.

20. The lightwave component measurement system of claim 14 wherein the tuned vector receiver has a second input port, further comprising a power splitter connected to the modulation source for feeding a selected portion of the electrical signal generated by the modulation source to the electro-optical transducer included in the lightwave source and another portion of the electrical signal generated by the modulation source as a reference signal to the second input port of the tuned vector receiver.

* * * * *